Oct. 11, 1932.  G. ROSENQVIST  1,882,522
METHOD OF JOINING PREFORMED METALLIC ARTICLES WITH A GALVANOPLASTIC BODY
Filed Nov. 15, 1928

INVENTOR

Patented Oct. 11, 1932

1,882,522

UNITED STATES PATENT OFFICE

GUNNAR ROSENQVIST, OF PITTSBURGH, PENNSYLVANIA

METHOD OF JOINING PREFORMED METALLIC ARTICLES WITH A GALVANOPLASTIC BODY

Application filed November 15, 1928. Serial No. 319,534.

This invention relates to a method of integrally joining preformed metallic articles with a galvanoplastic body formed by electrolytic process. As for example, the joining of exserts, such as hinge and handle brackets to seamless one-piece caskets as disclosed in my copending application, Serial No. 220,945, filed September 21, 1927 which has eventuated into Patent No. 1,853,700 dated April 12, 1932.

As therein described, exserts may be integrally joined with electrolytically deposited metal bodies by providing recesses of the shape and form of the exserts in the mold in which the galvano-plastic body is deposited. The exserts are constituted inserts in the molds and with the mold form a continuous surface upon which the galvanoplastic metal is deposited.

As disclosed in my above mentioned copending application, the metal deposited upon the mold and exposed surface of the insert forms in such manner that the section adjacent the interstices at the juncture of the mold and inserts constitute weak sections.

On account of the impracticability of snugly fitting the inserts in the mold recesses, the deposited metal forms weak sections in line with the joint, due to the formation of the crystals across the gap of the joint and it is to strengthen the joint so formed that the present invention is designed.

Figure 1:
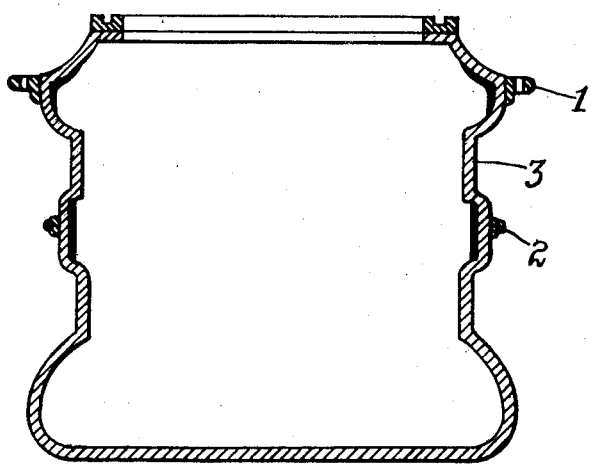
Figure 2:
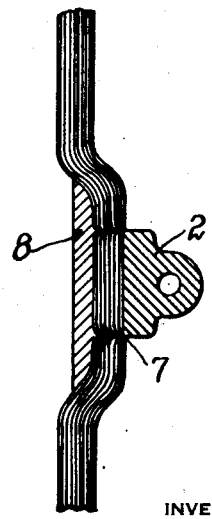

In the accompanying drawing constituting a part hereof, and in which like reference characters designate like parts, Figure 1 is a cross sectional view of a casket to which the invention is applied; Figure 2 is an enlarged sectional view of an exsert joined to a galvanoplastic body and reinforced at its joint; and Figure 3 is a view corresponding to Figure 2 showing a portion of the mold surrounding the exsert.

As shown in Figure 1, hinge and handle brackets 1 and 2 respectively constitutes exserts on a galvanoplastic body 3 in the form of a casket made by electrolytically deposited metal which is formed on the inner face or matrix surface of a mold corresponding in size and outline to the finished article.

Figure 3:
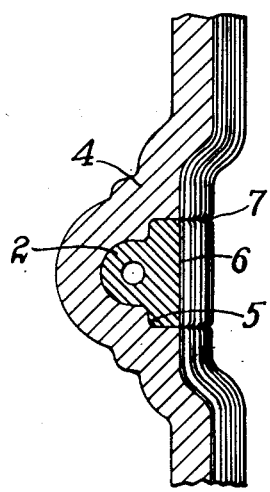

In Figure 3, 4 designates the portion of the mold which is provided with a recess 5 corresponding in dimensions to the handle lug 2 which is placed as an insert in the recess and the exposed surface of said insert constitutes a portion of the mold for receiving deposited metal while the casket body is formed.

The inserts are, of course, pickled in acid to clean them and I prefer to prepare said inserts by electroplating them with copper to produce a bright clean surface for receiving the deposited metal.

The matrix surface of the mold is prepared in a suitable manner, well known in the art to prevent adherence of the electro-deposited metal thereto, and the inserts are then placed in the recesses of the mold which is subsequently filled with a solution and electrically connected to a source of current.

The metal is deposited on the surface of the mold and the exposed surface 6 of the insert 2, and is built up to a predetermined thickness by continuing the process. The built up section is diverted as shown at 7, forming a weak section through the body in line with the joint where the edge of the insert 2 meets with the mold portion, such lines being somewhat exaggerated for the purpose of illustration.

Since the members 2 constitute handle brackets, as shown in Figure 1, they must be of sufficient strength to bear the entire weight of the casket which weighs several hundred pounds and to overcome the weakness at the joint 7, as previously explained, the deposited metal in the region of the joint is reinforced by a section of solder 8 as shown in Figure 2. The reinforcing section envelopes a surface on the inner face of the deposited metal, the area of which is several times that of the exsert 2.

By indenting the article in the region where the exsert is attached as shown in Figure 3 by recessing the mold in the region of the insert, a heavy section of solder reinforcing may be applied without projecting the reinforcing beyond the inner face of the article.

I have found that by reinforcing the joint in this manner it is impossible to tear out the exsert from the body of galvanoplastic metal and by the use of the solder, any stress on the exsert 2 is distributed over a much larger area than the area of contact between the exsert and the casket body.

Although the invention has been illustrated as an embodiment of a casket structure, it will be obvious to those skilled in the art that it may be employed for reinforcing joints where articles are integrally joined with galvanoplastic bodies.

I claim herein as my invention:

The method of joining preformed metallic inserts with a body of galvanoplastic metal which comprises providing a cathode with a recess and placing the insert in the recess of the cathode, exposing a portion of said insert as a part of the cathode to an electrolytic solution to deposit a body of galvanoplastic metal on the cathode and insert, and filling the crevices formed by the crystalline structure of the galvanoplastic metal at the joints of the insert with a reenforcing metal to interlock said crystals and extending said reenforcing metal over a relatively large surface area of the galvanoplastic body.

In testimony whereof I have hereunto set my hand this 14 day of November, 1928.

GUNNAR ROSENQVIST.